Dec. 15, 1970 A. L. HOLMAN 3,547,610
ENVIRONMENTAL CONTROL DEVICE FOR A MOLTEN GLASS FIBERIZER
Original Filed Feb. 20, 1967

INVENTOR.
ARTHUR L. HOLMAN
BY
Staelin & Overman
ATTORNEYS

United States Patent Office 3,547,610
Patented Dec. 15, 1970

3,547,610
ENVIRONMENTAL CONTROL DEVICE FOR A MOLTEN GLASS FIBERIZER
Arthur L. Holman, Newark, Ohio, assignor to Owens-Corning Fiberglas Corporation, a corporation of Delaware
Continuation of application Ser. No. 617,411, Feb. 20, 1967. This application Oct. 20, 1969, Ser. No. 867,966
Int. Cl. C03b 37/06
U.S. Cl. 65—7                                12 Claims

ABSTRACT OF THE DISCLOSURE

An apparatus and method for introducing induced gaseous environmental atmosphere to the base of a fibrous glass feeder for controlling the environment.

Specifically stated the invention is an improvement in a glass fiberizing apparatus comprising a feeder which supplies molten glass through orifices for attenuation into fibrous form by a gaseous blower below the base of the feeder. The improvement directs the induced ambient atmosphere, which normally flows over the blowers, toward the base region of the fibrous glass feeder and effects a cooling of said base region as well as providing an environment conducive for the production of glass fibers.

---

This application is a continuation of Ser. No. 617,411 filed Feb. 20, 1967, now abandoned.

BACKGROUND OF THE INVENTION

Field of invention

The field of this invention is within the art of forming glass fibers from a molten glass feeder.

Description of the prior art

The prior art relating to the production of glass fibers generally relies upon a mechancal or gaseous attenuation of fibers from a molten glass feeder. In order to effectuate a proper environment surrounding the feeder orifices from which the molten glass emanates and is subsequently attenuated, various temperature control devices, perturbation limiting means, and surrounding mediums have been tried with various degrees of success. The foregoing means have attempted to effectuate a proper fiberizing viscosity, surface character and cooling of the molten glass as it is pulled from the feeder orifice. The foregoing can be exemplified by the heat shields commonly placed between feeder orifices in the process of mechanically attenuating textile glass fibers.

This invention provides a means for directing the ambient atmosphere surrounding the fiberizing apparatus into a position whereby it will provide a cooling effect on that portion of the feeder base where the fibers are formed and control the temperature, viscosity and environment of the molten glass emanating therefrom for the proper gaseous fiberization thereof.

Specifically this invention relates to the gaseous attenuation fiberizing method for making glass fibers which are used either in mat or bat form. The prior art relating to such gaseous fiberization has relied upon controlling the fiberizing apparatus in its entirety by changing the heat of the molten glass feeder and/or the volume and force of the gaseous materials emitted from the gaseous blower.

Although these control methods have permitted the commercial production of glass fibers, for mats and bats, they have not provided a fine control of the apparatus, particularly with respect to the fiber forming zone.

The environment and temperature of the melting apparatus generally encompasses that of the forming zone where the fibers are emitted or drawn from the molten glass feeder. Inasmuch as the forming zone should be critically controlled as to both the temperature and the environment thereat, and fine control of the entire fiberizing apparatus prior to this time has not been obtainable, the fibers drawn from such gaseous fiberizing apparatus have not been of as high a grade as those which otherwise might have been obtainable.

Thus this invention has enhanced the use of gas attenuation fiberizing apparatus by permitting a finer control of the fiber forming zone thus producing a higher quality fiber in greater quantity.

OBJECTS OF THE INVENTION

From the foregoing it can be seen that a broad object of this invention is to provide an environmental control device for effectively fiberizing glass fed from a molten glass feeder.

Another object of this invention is to utilize the ambient atmosphere for purposes of providing a relatively nondisturbing environmental control medium at the forming zone of a molten glass feeder without the requirement of additional energy.

A further object of this invention is to provide an adjustable cooling and environmental control device at the base of a molten glass feeder so that changes with respect to the fiberizing process may be compensated for.

SUMMARY

The instant invention comprises a means and method for directing the ambient air, surrounding a glass fiberizing apparatus, against the base of the feeder from which the molten glass emanates. The flow of air provided at the base of the feeder cools the orifices, or feeder tips and creates an enhanced environment for the fiberization of the molten glass flowing therefrom.

Specifically the ambient air induced by the forces of attenuation is directed by a planar or air foil like surface. The angle of direction is dependent upon the criteria dictated by the forces of attenuation, the type of glass being fiberized, the amount of induced air flow and the size and physical configuration of the attenuating apparatus. The direction and attendant volume of induced ambient air directed against the base of the molten glass feeder is related to the foregoing criteria and must be maintained at an equilibrium to provide the most desirable attenuation of the glass emanating from the orifices at the base of the feeder.

The invention further comprises a means for adjustably controlling the volume and angle of the induced ambient air directed toward the base of the feeder so that it may be varied to meet changes in the fiberizing environmental requirements.

DESCRIPTION OF THE PREFERRED EMBODIMENTS

Figures 1, 2:
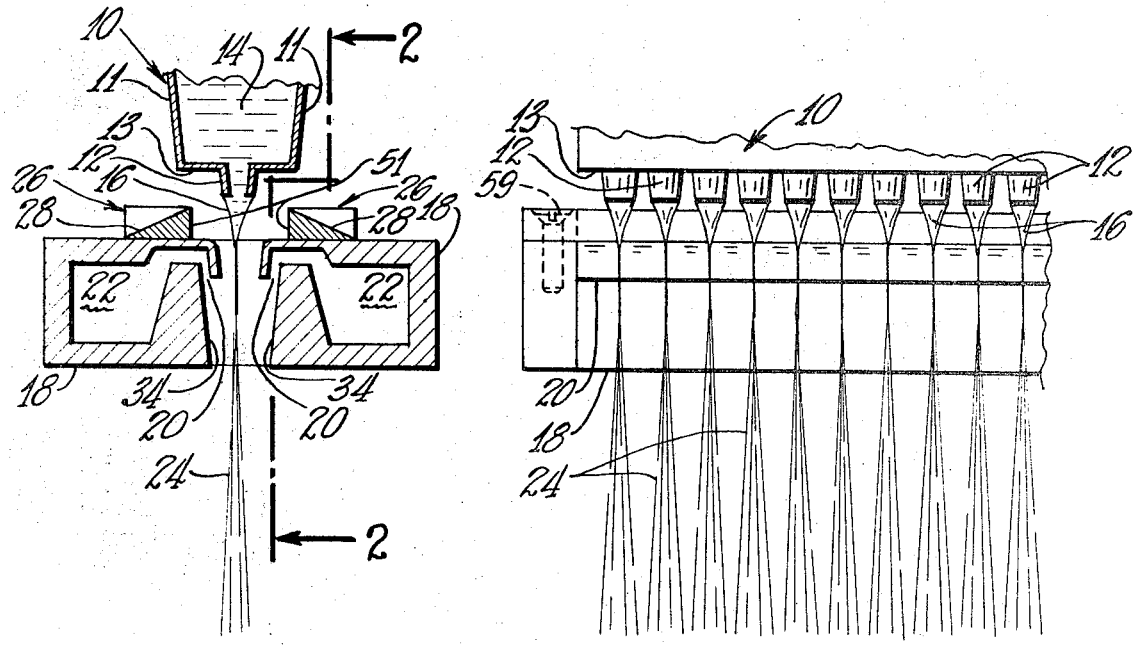
FIG. 1 shows a molten glass feeder with an orifice, or tip therein and a supply of molten glass flowing therethrough. Beneath the molten glass feeder are two attenuation blowers employing the instant invention.
FIG. 2 is a side elevation view of the molten glass feeder and attenuation blowers with the invention affixed thereto and taken along the line 2—2 of FIG. 1.

FIG. 1 shows a molten glass feeder 10 with a melt of glass 14 therein. The feeder has an orifice or tip section 12 from which the glass 14 emanates. Inasmuch as the glass 14 is being fiberized, it emanates in a necked down form as a cone 16.

Beneath the feeder 10 are a pair of blowers 18. The blowers 18 have slots 20 in them from which gaseous products of combustion, steam, or air flow. The walls of the blower 18 are of a high strength material to withstand the pressures within the blower chamber 22. The gaseous substances emanating from the blower slot 20 are directed downwardly and seize the glass 14 flowing from the glass feeder 10. Inasmuch as the sides of each blower 34 are generally symmetrical and are placed beneath the orifice 12 of the feeder 10 in a generally bilaterally symmetrical manner, the seizure of the molten glass 14 emanating from the orifice 12 in the glass feeder 10 is effectuated in a generally uniform manner thus producing glass fibers 24.

The fibers 24 produced in the foregoing manner are generally used for purposes of making fibrous mats, bats and staple fibers for use in the textile field. Inasmuch as the continuity of the fiber 24 cannot be maintained, there are generally speaking no long continuous filaments within the products which are drawn from the fibrous glass feeder 10 by the foregoing method of gaseous attenuation and fiberization. The fibers are collected on a moving mat below the foregoing fiberizing apparatus. If the fibers are formed into a textile product they are usually drawn and twisted into a roving, or tow. Generally though the fibers are formed as a mat, or bat and treated with an appropriate binder which secures the fibers into the foregoing forms. When the molten glass feeder 10 is placed in series with other feeders across the width of a conveyor, the entire conveyor is covered with glass fibers 24 during the attenuation process, and the thickness of the mat or bat may be controlled by the speed of the conveyor and the amount of fibers drawn from the molten glass feeder 10.

The heating of the molten glass feeder 10 is usually accomplished by electrical resistance. The feeder walls 11 themselves may be heated, by the electrical resistance thereof, or a plurality of coils may be placed adjacent the wall 11 for the heating of the feeder 10. The tips or orifices 12 at the base of the feeder 10 are subject to the same temperature and heating conditions which the entire feeder 10 is subject to due to the transmittance of the heat supplied through the glass 14 and the total feeder vessel 10.

It is generally desirable to maintain the glass melt 14 within the feeder 10 during a protracted period of time at the upper optimum melting temperature of the particular glass. The longer the glass is maintained at its optimum upper melting temperature the less inhomogeneities are present and the more the glass 14 is capable of mixing by means of convection, providing a greater quantity of glass capable of being fiberized. Furthermore the constant addition of new batch requires mixing the added batch into the total melt 14. The longer glass residence time at the upper optimum temperature provides a uniformity of mix and homogeniety within the melted glass 14 emanating from the feeder tips 12.

As previously stated the tip section 12 and orifice therein at the base of the molten glass feeder 10 is subject to the conditions which exist throughout the whole molten glass feeder 10. This tends to effect the entire fiber forming process because the tip section 12 and orifice therein with the cone 16 emanating therefrom are at the point of fiberization. For optimum fiberization the molten glass 14 should be within a particular set of temperature and viscosity limits and should have a distinctive environment from that of the entire feeder 10. It is not only the tip section 12 and base 13 of the feeder 10 which must be controlled in a distinct manner from that of the feeder 10 and the glass 14 therein, but also the glass of the cone 16 which is in a molten but more viscous state than the glass 14 in the feeder 10. It is within the tips 12 and cone 16 that the most critical aspect of the fiberizing process takes place. If the temperature is too high within the cone 16 and the environment is not proper surrounding the cone 16, the surface tension and the viscosity of the glass 14 will be drastically altered. It can be appreciated that the environment creating the surface tension and viscosity within the cone 16, and the attendant flow therefrom must be critically controlled. If the environment is not controlled there tends to be a passing of the glass 14 through the orifice or tips 12 at a much lesser or greater rate than is desirable to draw a proper fiber.

The tip section 12 or the orifice as well as the molten glass cone 16 emanating therefrom should be kept at an advantageous fiberizing temperature and enviroment which is generally lower than the feeder 10. This becomes difficult when large amounts of glass 14 are melted. In order to have the proper residence time of the glass 14 within the molten glass feeder 10 at an optimum upper temperature, and at the same time maintain the tip section 12 and molten glass cone 16 attendant therewith at a lower temperature and higher viscosity, respectively for the proper fiberization of the molten glass draws upon adverse and oppositely working conditions.

The instant invention provides a high throughput and long residence time at an optimum upper temperature within the molten glass feeder 10 and at the same time a lower tip 12 and cone 16 temperature with an attendantly lower viscosity of the molten glass cone 16. The fibers 24 drawn using the instant invention have been superior to those fibers drawn from existing molten glass feeders as to their consistency of diameter, strength characteristics, and quantity.

The gaseous emission from the blower slot 20 creates a drawing effect between the molten glass feeder 10 and the blowers 18 whereby the ambient atmosphere or air surrounding the apparatus is induced to flow between the molten glass feeder 10 and down between the blowers 18 by aspirational forces. Inasmuch as the induced ambient atmosphere is induced to flow downwardly between the blowers 18 by the aspirating forces of attenuation, the induced atmosphere in the prior art without the aid of the instant invention has had little effect upon the environment and the temperature at the base 13 of molten glass feeder 10 and the tips 12 thereof.

By means of the air foils or induced air distributors 26 of this invention, the induced air which would normally be wasted or lost by flowing downwardly between the walls 34 of the blowers 18 is directed upwardly toward the base 13 and the orifices or tips 12 of the molten glass feeder 10. The induced ambient atmosphere which is directed upwardly toward the base 13 of the molten glass feeder 10 converges at the base 13 and within the environment of the tips 12. This induced ambient atmosphere surrounds and forms an environment between each tip 12 and cone in its respective position. This helps to prevent heat passage between each tip 12 and further provides a cooling effect on the tip 12 itself and the base 13 of the molten glass feeder 10.

The induced ambient atmosphere converging at the tip section 12 of the base 13 of the molten glass feeder 10 not only provides a constant cooling effect and helps to eliminate heat transfer by convection and conduction between the tips, but also provides an environment surrounding the cone of molten glass 16 which creates a higher surface tension at the surface of the cone 16, and at the same time maintains the cone 16 in a finely delineated temperature environment from that of the total feeder 10 and its surroundings without substantially disturbing the fiberization process taking place at the molten glass cone 16.

The introduction of the ambient air is efficacious because of the gentle flow thereof. The probability of disturbance at the cone of molten glass 16 is much less than if a coolant were introduced from a pressure source.

Figures 3, 5:
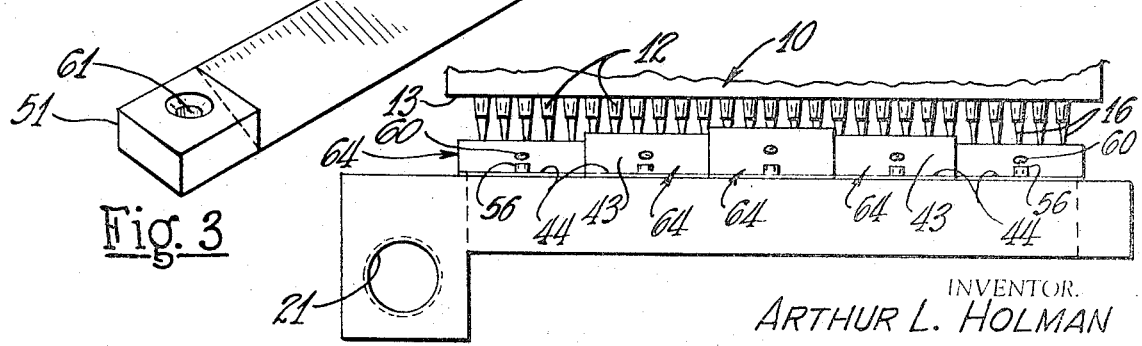
FIG. 3 shows a simple specific embodiment of the instant invention without any cooperative support elements or variable adjustment means.
FIG. 5 shows a side elevation of this invention capable of adjustment along the length of a molten glass feeder.

It has been found that one of the best embodiments of the instant invention is to use the following dimensional relationships with respect to the design as shown in FIG. 3. The air foil shown therein has an inclined surface 28 with a leading wall 51. The foil is affixed to the blower by means of two screws 59 inserted through holes 61 in the blower 18 and air foil 26.

The angle of the inclined upwardly directed surface 28 from a line drawn normal to the center line extending from the tips 12 should be roughly twenty-five degrees. The distance from the top of the inclined plate 28 at the front edge of the vertical wall 51 should be approximately one sixteenth of an inch below the ends of the tips 12. This provides a proper environment and sufficient cooling of the tips in the area between the base 13 of the molten glass feeder 10 and the cone 16 at the point of fiberization. The set back of the vertical wall 51 or front lip should be about seven sixteenths of an inch from the center line extending from the tips 12.

It has been found that the foregoing configuration work well with a type of glass known in the fibrous glass art as "C" glass compound of 64.4% $SiO$, 3.7% $Al_2O_3$, 13.1% $CaO$, 3.2% $MgO$, 6.1% $B_2O_3$, 7.7% $Na_2O$, 29% $K_2O$, .75% $BaO$, .2% $Fe_2O_3$, .2% $TiO_2$, .2% $Sa_2$. The blower pressure should be roughly about 120 lb./p.s.i. and the glass should be generally in the range of between 2190° F. and 2500° F. depending upon the size of fiber desired.

Figure 4:
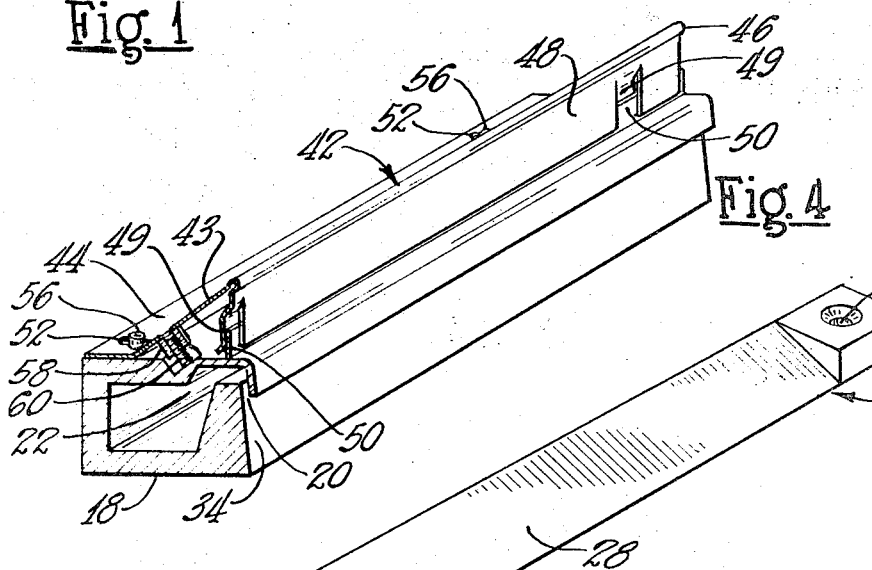
FIG. 4 shows an adjustable embodiment in perspective of the instant invention affixed to a blower.

FIG. 4 shows the instant invention in the form of an adjustable foil 42. An adjustable air foil 42 can be used when variable pressures in the blower are employed or the feeder 10 requires a change in melting temperatures. The adjustable foil 42 also finds use when different types of glass with different viscosities and temperatures are fiberized thus making compensation for them within the fiberizing system. The variable aspects of the modified air foil 42 allow a change in angle of the major surface of the air foil 42 so that variable quantities of induced ambient atmosphere can be directed toward the base 13 of the glass feeder 10 and the molten glass cone 16 thereat.

Specifically the variable air foil 42 comprises a plate 44 or lead surface hinged or moveable with respect to an upwardly inclined plate 43. At the leading edge of the inclined plate 43 is a front wall 48 hinged or movably affixed to the inclined plate 43 by a bendable or hinged lip 46 thereat. The back leading plate 44 is slotted 52 with an adjusting screw 56 therein such as an Allen screw. The inclined upwardly directing surface 43 has a screw fitting 58 therein with a set screw 60 threaded therein. The upright wall 48 is tabbed at 49 to slidably accommodate the upright wall 50 affixed to the blower 18.

Adjustment of the angle of inclination of the inclined wall 43 may be obtained by loosening the back lead surface locking screw 56 and adjusting the set screw 60. This accommodates the movement of the distributor 42 and the inclined surface or plate 43 into the desired angle of inclination for distributing the induced air toward the base 13 of the molten glass feeder 10. After the distributor 42 has been adjusted by the set screw 60, it may then be locked in place with the back lead surface locking screw 56.

During the continuous operation of a molten glass feeder 10 the heat pattern often varies along the length of the base 13 thereof. It is thought that this occurs from the tips 12 or base 13 at the ends of the feeder having a greater exposure to the atmosphere and consequently running at a cooler temperature. Furthermore, it is often difficult to control the feeder 10 exactly by the electrical heating thereof due to variances in the conductivity of the feeder 10 and the molten glass 14 therein. There is a disparity in the temperature, viscosity and environment of the glass 14 in the tips 12 and cone 16 along the length of the feeder 10 in cases where the heat pattern varies. This creates irregularities in the glass fibers 24 being fiberized.

This invention also provides a means for obtaining greater uniformity in the heat pattern along the length of the feeder 10. The cooling effect of the invention may be controlled along the length of the feeder 10 by the modification shown in FIG. 5 to provide a variable degree of cooling, resulting in a more uniform heat pattern along the length of the feeder 10, and the tips 12 associated therewith. FIG. 5 shows a side view along the length of the feeder 10 with the tips 12 and glass cone 16 extending therefrom. A standard blower 18 is shown with a steam port 21 for the introduction of steam. The variable air foils 64 along the length are shown in an adjusted series position to provide the greatest amount of cooling at the center of the base 13 of the feeder 10 where the heat is usually greatest.

Specifically the variable air foils for controlling the uniformity of heat pattern along the length of the feeder 10 at the base 13 comprise a plurality of smaller adjustable foils 64 in series along the length of the feeder 10. The air foils 64 may be individually adjusted along an increment of the base 13 to provide a cooling effect at the base 13 of the feeder 10 for regulation of the temperature gradient. The temperature gradient may be determined by using an optical pyrometer, and adjusting the air foils 64 to accommodate the gradient in temperature.

The foils may be adjusted by means of the screw 56 at the lead plate 44 being loosened with an attendant adjustment of the set screw 60. The raising and lowering of the inclined plate 43 delivers greater and lesser amounts of air to each respective increment of the base 13 along the feeder 10 and provide a variable degree of cooling depending upon the heat pattern, and the requirements of uniformity.

The foregoing specification is descriptive of the invention, but the breadth thereof is to be read in light of the claims which follow hereafter.

I claim:
1. A fiberizing apparatus comprising:
   a molten glass feeder having orifices in the base thereof from which molten glass emanates; and
   gaseous blower means located beneath said orifices blasting and attenuating into fibrous form the molten glass emanating from said feeder and inducing a flow of ambient atmosphere between said feeder and said blower means by reason of the gaseous blast from said blower means said blower means further having an upper inclined surface sloping upwardly toward said feeder for directing the flow of ambient atmosphere toward said feeder and feeder orifices.
2. A fiberizing apparatus as defined in claim 1 wherein said blower means comprises a pair of gaseous blowers located beneath said orifices; each of said blowers having an upper inclined surface sloping upwardly toward said feeder for directing the flow of ambient atmosphere toward said feeder and feeder orifices.
3. A fiberizing apparatus comprising:
   a molten glass feeder having orifices in the base thereof from which molten glass emanates;
   a pair of gaseous blowers beneath said orifices downwardly pulling and attenuating into fibrous form the molten glass emanating from said feeder, the gaseous blast of which induces a flow of ambient atmosphere between said feeder and said blowers; and
   means for concentrating the induced ambient atmosphere toward the base region of said feeder having at least one plate with a major surface thereof sloping upwardly and inwardly toward the base region and orifices of said feeder, said plate surface being formed by the upper portions of said gaseous blowers opposite the base region of said molten glass feeder.
4. A fiberizing apparatus comprising:
   a molten glass feeder having orifices in the base thereof from which molten glass emanates;
   gaseous blower means beneath said orifices downward- ly pulling and attenuating into fibrous form the molten glass emanating from said feeder, the gaseous blast of which induces a flow of ambient atmosphere between said feeder and said blowers; and means for concentrating the induced ambient atmosphere toward the base region of said feeder comprising an elongated member, said member having a length generally coextensive with the orifices from which the molten glass flows, said member being affixed to said gaseous blower means with an elongated surface thereof sloping upwardly from the upper and outer region of said blowers to an inner position above the upper region of said blowers so that the ambient atmosphere normally induced between said blowers and the base region of said feeder wil be directed upwardly toward the base region of said feeder, thereby providing a cooling and controlled environmental effect for the attenuation of the molten glass emanating from said feeder into fibrous form.

5. A fiberizing apparatus as defined in claim 4 wherein said elongated member has means hingeably mounted on said blower means to change the concentration and volume of the induced atmosphere directed toward the base region of said molten glass feeder so that the temperature and environment thereof can be partially variably controlled by said elongated member.

6. In an elongated molten glass feeder having orifices therein from which molten glass emanates and is seized by gaseous emissions from a gaseous blower means which attenuate said glass into fibrous form and attendantly induce the surrounding atmosphere to be drawn between said glass feeder and said blower means wherein the improvement comprises:

a plurality of air foils, placed between said glass feeder and said blower means, each having a major surface which is angularly displaceable from the upper surface of said blower means so that each air foil directs variable amounts of the induced surrounding atmosphere toward the base region of said feeder to provide variances in the amount of cooling and environmental control provided thereby along the length of the base of said glass feeder and the orifices therein.

7. In an elongated molten glass feeder as defined in claim 6 wherein said gaseous blower means comprises a pair of elongated blowers disposed beneath said feeder and said orifices therein, and further including:

a plurality of air foils associated with each of said blowers and disposed between said blowers and said feeder, each of said air foils having a major surface which is angularly displaceable from the upper surface of said associated blower, and means for independently varying the angular displacement of each of said air foils to provide variances in the amount of induced atmosphere directed toward the base region of said feeder along the length of said feeder and orifices therein.

8. In an aparatus as described in claim 7 wherein each of said air foils comprise:

a plate flexibly extending from the outer region of said blowers upwardly and inwardly toward the inner gaseous emission region between said blowers;

an adjusting means for adjusting the angle of displacement of said upwardly extending plate from the upper surface of said blowers; and an inner wall extending from the surface of said blowers in an upward manner generally in the direction of fiberizing attenuation and connected to the inner terminal point of said upwardly extending plate so that said plate and wall form a surface over which the induced atmosphere is directed partially upwardly toward the base of said feeder and partially downwardly in a smooth manner between said blowers.

9. A fiberizing apparatus comprising:

a molten glass feeder having orifices in the base thereof from which molten glass emanates;

gaseous blower means located beneath said orifices blasting and attenuating into fibrous form the molten glass emanating from said feeder and inducing a flow of ambient atmosphere between said feeder and said blower means by reason of the gaseous blast therefrom; and said blower means having an inclined plate sloping upwardly toward the base region of said molten glass feeder and inwardly in the direction of gaseous emission from said blower means and an upright wall extending from said blower means to the inner terminal point of said inclined plate so that the induced ambient atmosphere will flow over said inclined plate and will be directed upwardly toward the base of said molten glass feeder.

10. A fiberizing apparatus comprising:

a molten glass feeder having orifices in the base thereof from which molten glass emanates;

a pair of gaseous blowers beneath said orifices downwardly pulling and attenuating into fibrous form the molten glass emanating from said feeder and inducing a flow of ambient atmosphere between said feeder and said blowers; and means for concentrating the induced ambient atmosphere toward the base region of said feeder having at least one planar member with a major surface thereof sloping upwardly and inwardly toward the base region and orifices of said feeder.

11. A fiberizing apparatus as described in claim 10 and further including:

means for incrementally varying the amount of induced ambient atmosphere concentrated toward the base of said feeder along the length of said feeder comprising a plurality of planar members each having at least one major surface thereof sloping upwardly and inwardly toward the base region and orifices of said feeder, and means for individually varying the inclination of said planar members.

12. A method of controlling the environment of the base region of a fibrous glass feeder in combination with at least one blower located beneath said feeder, comprising:

blasting molten glass flowing from said feeder with a gaseous substance from said blower to attenuatingly fiberize said molten glass;

inducing a portion of the ambient atmosphere to move toward the region of fiberization by downwardly blasting the molten glass with said gaseous substance; and angularly displacing the induced ambient atmosphere upwardly toward the base region of said fibrous glass feeder at different angles and amounts along the length of said fibrous glass feeder to provide a variable rate of cooling.

References Cited

UNITED STATES PATENTS

| 2,165,318 | 7/1939 | Thomas et al. | 65—16 |
| 2,632,287 | 3/1953 | Phillips | 65—12 |
| 3,232,730 | 2/1966 | Drummond | 65—12 |
| 3,257,181 | 6/1966 | Stalego | 65—2 |

S. LEON BASHORE, Primary Examiner

R. L. LINDSAY, JR., Assistant Examiner

U.S. Cl. X.R.

65—12, 16, 2